Jan. 27, 1970  G. H. HARRISON  3,491,816
BLOCK CUTTING SYSTEM AND APPARATUS
Filed Dec. 19, 1966  4 Sheets-Sheet 2
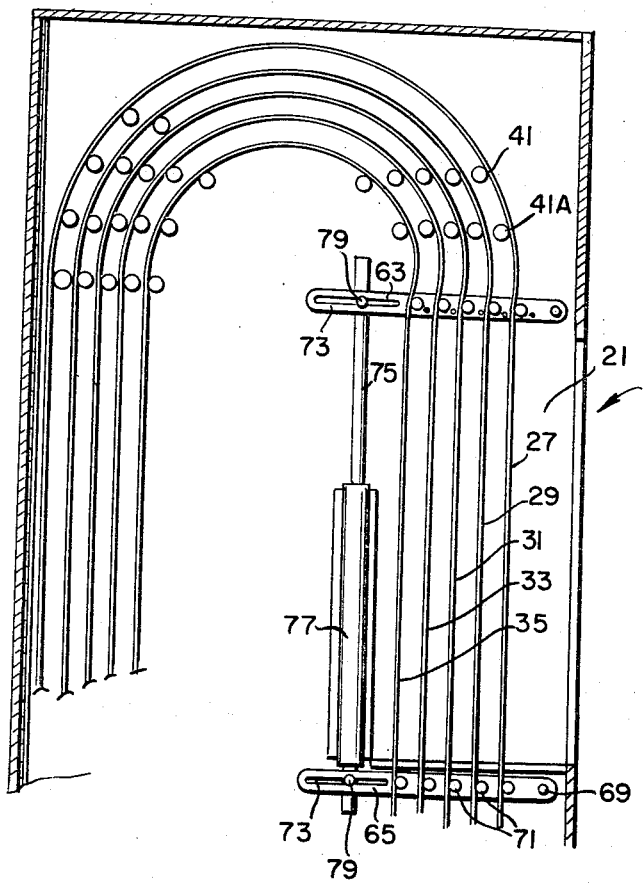
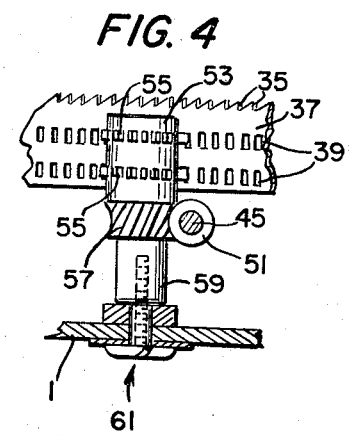
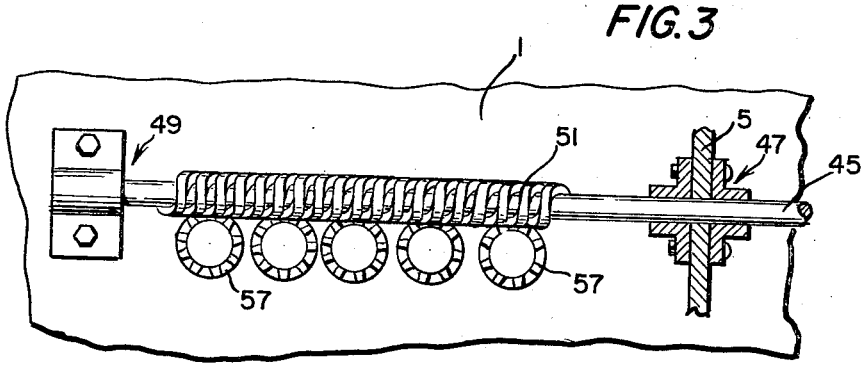
INVENTOR.
BY George Heller Harrison
Peck + Peck
ATTORNEYS INVENTOR.
BY George Heller Harrison
Peck & Peck
ATTORNEYS Jan. 27, 1970  G. H. HARRISON  3,491,816
BLOCK CUTTING SYSTEM AND APPARATUS
Filed Dec. 19, 1966  4 Sheets-Sheet 4
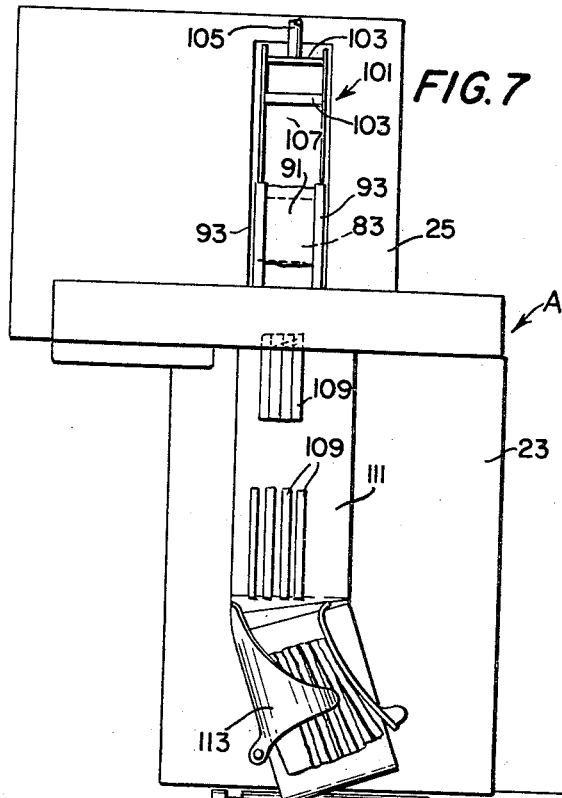
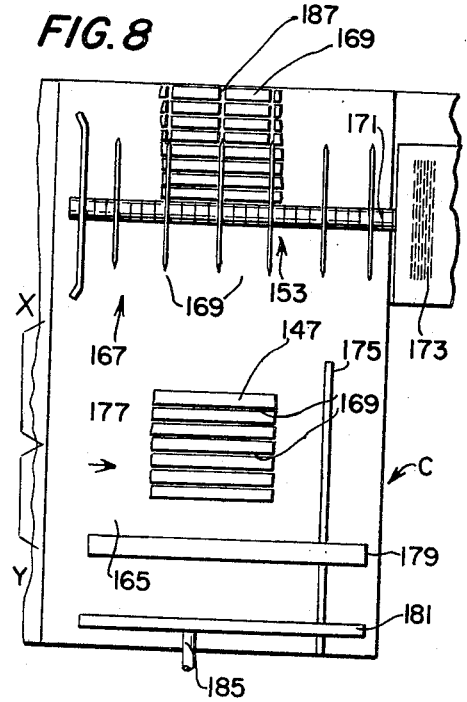
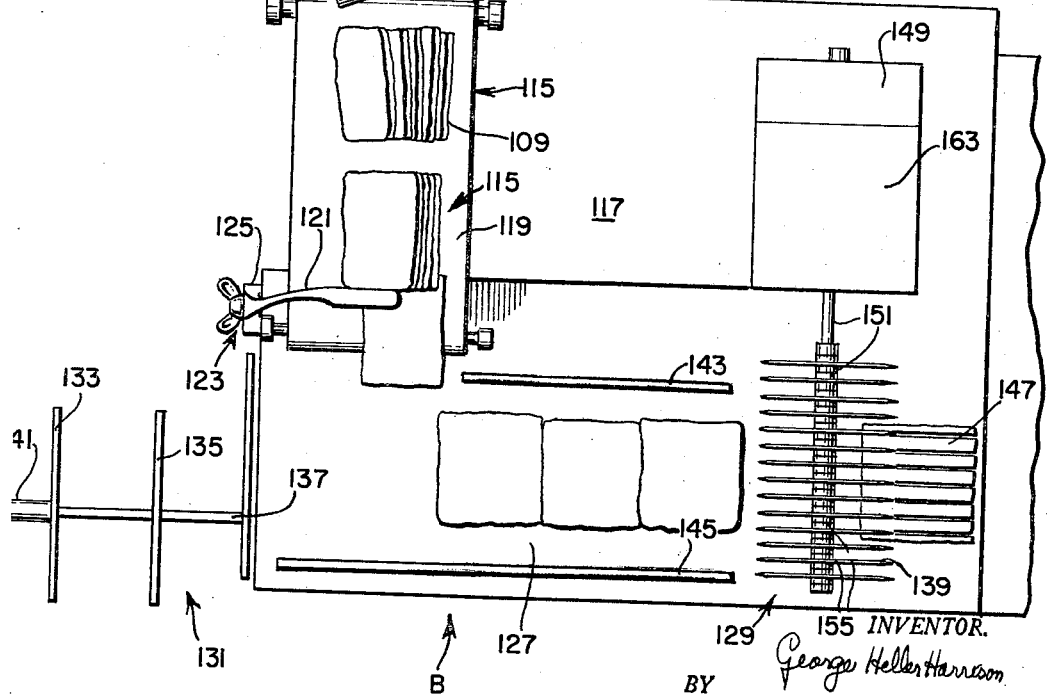
FIG. 7  FIG. 8
INVENTOR.
George Heller Harrison
BY Peck & Peck
ATTORNEYS United States Patent Office 3,491,816
Patented Jan. 27, 1970

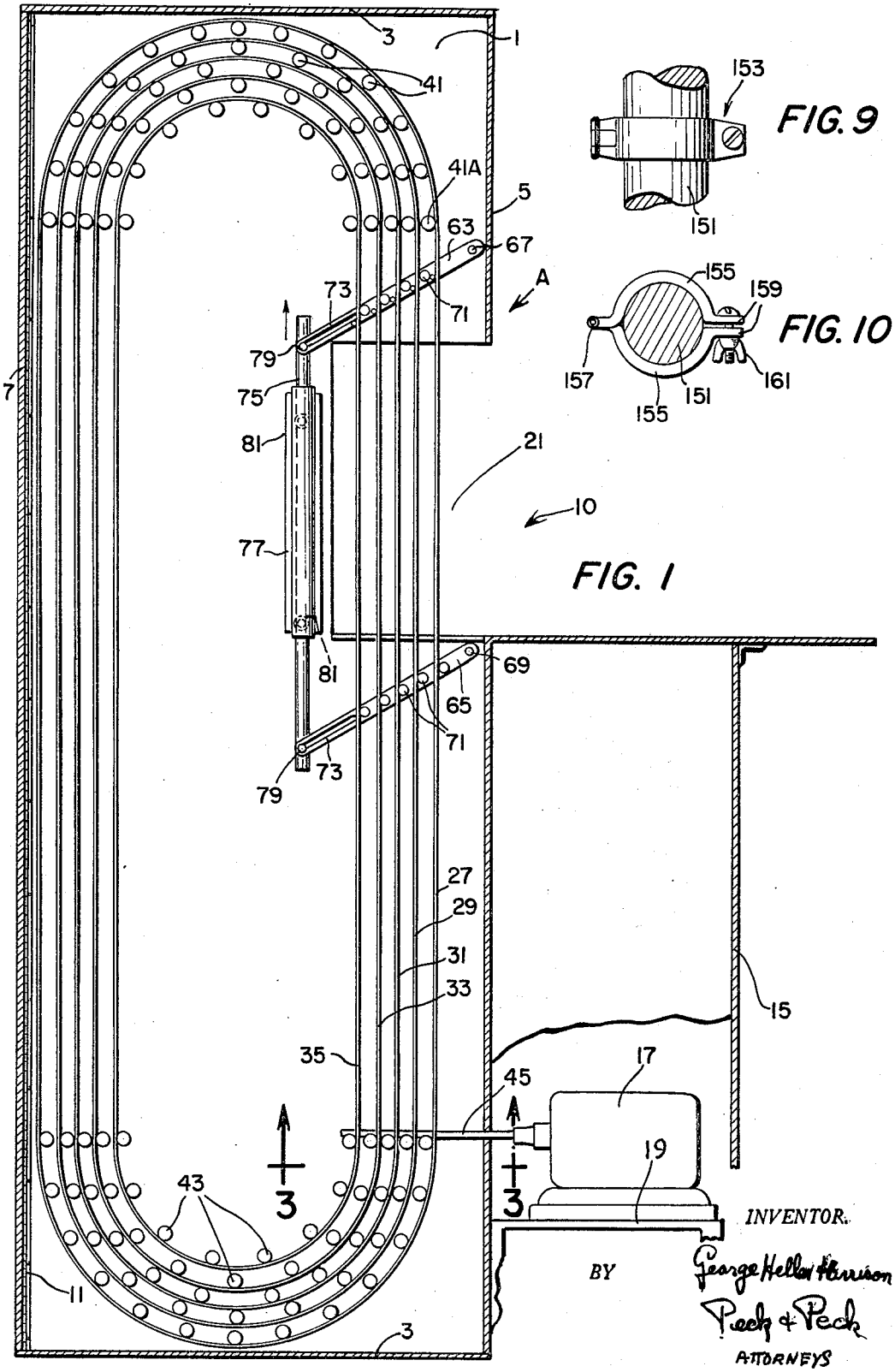

3,491,816
BLOCK CUTTING SYSTEM AND APPARATUS
George H. Harrison, Baltimore, Md., assignor to Harrison Foods Equipment Company, Baltimore, Md., a partnership
Filed Dec. 19, 1966, Ser. No. 602,998
Int. Cl. A01f 29/00; B26d 1/52; A23p 1/00
U.S. Cl. 146—78                                    2 Claims

ABSTRACT OF THE DISCLOSURE

This disclosure relates generally to a continuous, automatic method and apparatus for sawing and cutting elongated, generally rectangular blocks of rigid material into slabs of reduced dimensions, wherein the block is initially cut on one linear dimension, then the slabs are cut on a linear dimension substantially transverse thereto and the cut slabs are then cut on a linear dimension substantially transverse to the last named linear dimension.

---

This invention relates broadly to a system and apparatus for cutting solid blocks, and in its more specific aspects it related to such systems and apparatus wherein relatively large size rigid blocks are initially cut to smaller size, then such initially cut slabs are further transversely cut to smaller size, and then transversely cut from the second cutting to the size desired for ultimate use; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

While I shall hereinafter describe this invention with particular reference to frozen foods, such as sea food, it is to be recognized that it is endowed with versatile use characteristics which may be remote from the frozen food field, and it is therefore to be distinctly understood that I do not intend to limit my invention to use in this particular field, and its use in any other field will fall within the spirit and scope of this invention.

It is conventional practice, particularly in the freezing of substantially all types of sea food, to freeze such edible matter in relatively large blocks which are housed within a cardboard or the like casing. For instance, these initially frozen blocks of sea food may run anywhere from 2½ to 15 inches in width and approximately 16 inches in length and may be on the order of 12 inches high. It will, of course, be appreciated that the size of these initial frozen blocks of edible matter may be frozen in any desired dimensions, and this will depend somewhat upon the type of food being frozen, and the size in which the ultimate package thereof is desired to be presented to the consumer. In this particular field it is now customary to perform the initial cutting operation on these relatively large frozen blocks of edible material by means of a band saw, or the like, and such initial cutting or sawing operation cuts the original blocks into any desired number of elongated slabs of the frozen material. It is usual practice to introduce the original frozen block to the saw in vertical, or on end, position to produce the elongated slabs.

As far as I am aware, it is customary in this art at the present time, in this initial cutting or sawing operation, to provide only a single band saw, or the like, so that the operator must advance the original block into operative position for sawing only one at a time and then retract the block and again advance it into cutting position, repeating this operation until the block is completely cut into slabs of the desired thickness dimension.

It will be evident that this is a slow, cumbersome operation which is, of course, costly in both time and labor.

It has been one of my prime objects in developing my system and apparatus to provide means whereby this initial cutting or sawing operation is substantially expedited and provides actual and significant saving of labor.

In accomplishing this purpose I have devised a mechanism, for this initial cutting and sawing operation, which involves the utilization of a plurality of band saws so that in a single advancing or projection travel of the rigid frozen block it is cut into the desired number of elongated slabs, and in designing such mechanism I have not overlooked the fact that in such an operation the thickness or transverse dimension of the elongated slabs is often required to vary, for I have developed a means in this mechanism whereby the spacing of adjacent band saws may be varied so that the thickness of the resulting elongated sawed slabs may be varied.

In the development of this novel and unique cutting mechanism I have not sacrificed simplicity of operation and adjustment, so that the operator thereof need not be highly skilled.

A further significant feature of the band saw arrangement which I have evolved, for this initial cutting operation, resides in the unique type of band saw which is employed whereby the plurality of band saws which are used in this initial cutting operation are relatively independently mounted and actuated.

Following the initial cutting operation, which has been previously described above, it is usual to further process the elongated cut slabs by a further, or second cutting operation which transversely cuts these elongated slabs into slabs of smaller dimensions. I have devised a fully automatic arrangement whereby the initially cut elongated slabs are positionally altered for introduction into the second cutting operation which cuts such slabs transversely thereof.

After this initial cutting operation, as will be explained hereinafter, the plurality of elongated slabs are standing on end, and I have devised means which automatically shifts their position so that they are stacked with their flat surfaces forming the tops and bottoms thereof to place them in readiness for the second transverse cutting operation.

In many instances, it is desirable to reduce the thickness of the stack of slabs, that is to reduce the number of slabs in a stack, prior to advancing each stack of elongated slabs to the second cutting operation, and in order to accomplish this operation, simple means have been provided for only permitting the predetermined number of slabs from a stack of slabs to be introduced into the second cutting means.

The second cutting operation which, as I have stated, cuts the elongated slabs transversely, is performed by a plurality of rotary disc cutters and I have devised means whereby the spacing of such cutters may be varied to thereby vary the size of the slabs which are cut thereby.

In dimensionally processing or cutting frozen edible material, it is customary to provide a third, or final, cutting operation to provide the frozen slabs in the final desired size. I have provided automatic means for transferring the transversely cut slabs from the second cutting operation to a third cutting station, wherein rotary disc cutters are preferably used, and such rotary disc cutter may have their spacing varied in a simple manner, to provide different sizes in the final slabs of frozen material.

It is to be recognized that the various cutting operations, or stations, which will be described in detail hereinafter, may be used independently instead of serially or consecutively to provide the continuous operation which forms one facet of my invention.

With the foregoing general objects, features and results in view, as well as certain others which will be apparent from the following explanation, the invention consists in certain novel features in design, construction, mounting and combination of elements as will be more fully and particularly referred to and specified hereinafter.

Referring to the accompanying drawings:

FIG. 1 is a view in front elevation of the sawing and cutting apparatus comprising station A of my block cutting system and apparatus.

FIG. 2 is a view similar to FIG. 1 with parts thereof broken away and illustrating the individual band saw cutting elements with the normal spacing therebetween enlarged.

FIG. 3 is a view taken on the line 3—3 of FIG. 1.

FIG. 4 is a detail view illustrating a driving means for one of the band saws of FIG. 1.

FIG. 7 is a view taken on line 7—7 of FIG. 5.

FIG. 8 is a plan view illustrating the disc cutting mechanism of station C.

FIG. 9 is a plan view illustrating one of the removable spacer means operatively fixed to the disc cutting means drive shaft.

FIG. 10 is a view in elevation of one of the spacer elements in operative position on the disc cutter drive shaft, which shaft is illustrated in section.

In the accompanying drawings I have illustrated the initial block sawing station by the letter A, the second slab cutting station by the letter B and the final or third slab cutting station by the letter C.

Figure 5:
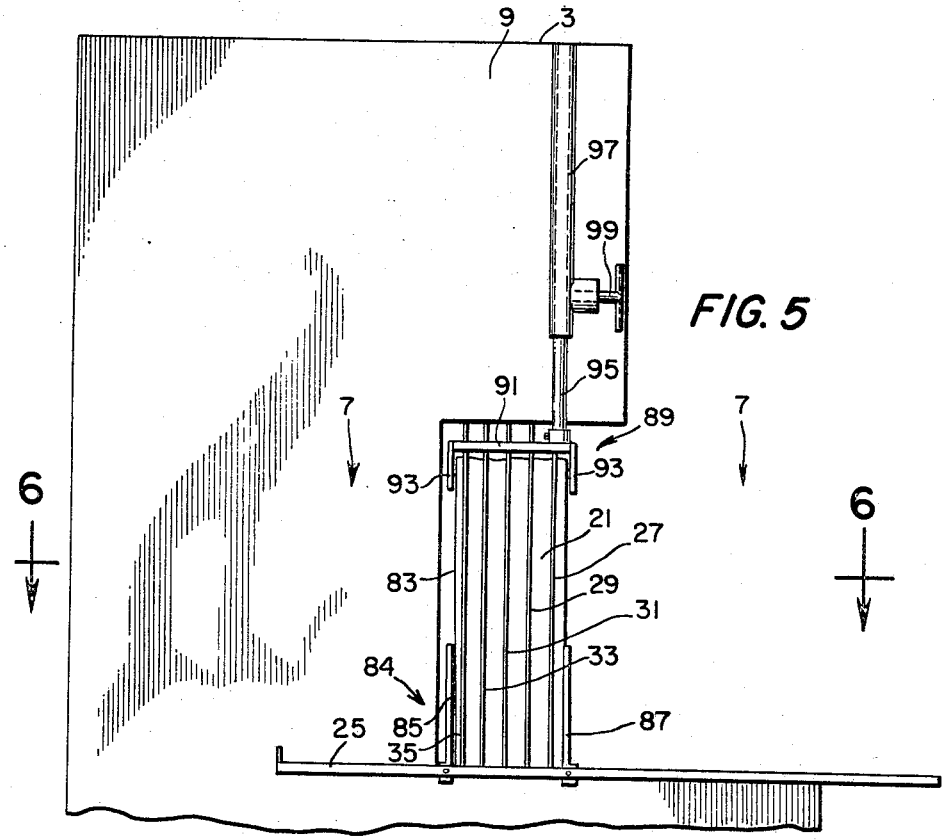
FIG. 5 is a front elevation of the band saw sawing mechanism and particularly illustrating the adjusting means for the guide for guiding each block into the sawing mechanism.
Figure 6:
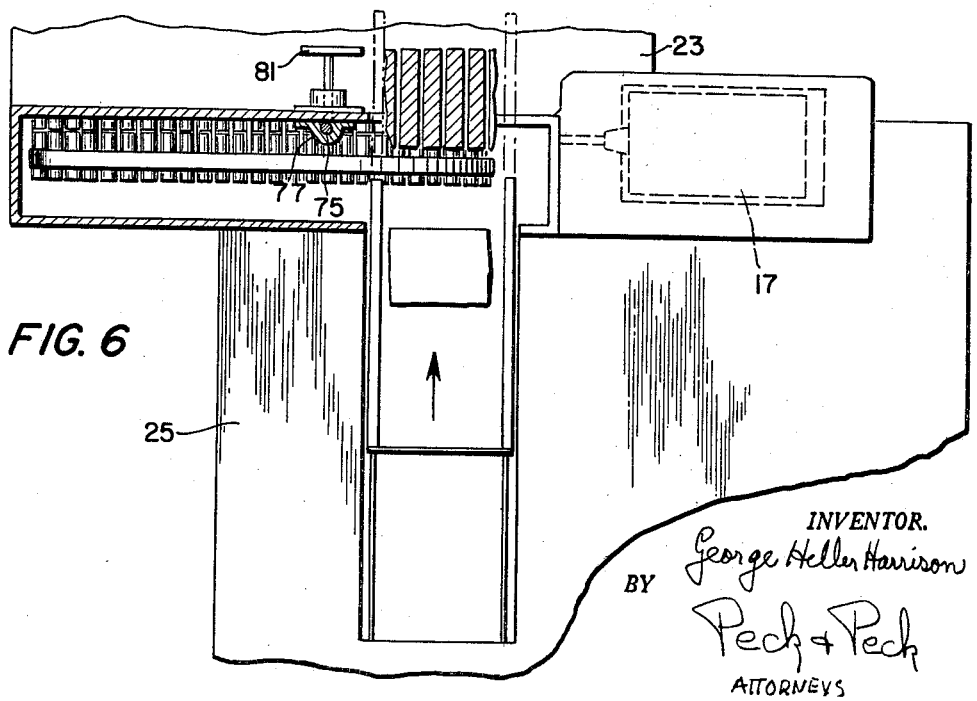
FIG. 6 is a view taken on the line 6—6 of FIG. 5.

Referring particularly to FIGS. 1 and 5 wherein the initial sawing station A is illustrated, it will be appreciated that the entire band saw sawing and adjusting mechanism is operatively mounted within any suitable type of housing which may comprise a rear wall 1, top and bottom walls 3, a side wall 5 and a side wall 7 to which a front closure member 9 is hinged by means of a piano, or like, hinge 11. It will be understood that the closure member is provided so that access may be gained to the interior of the housing for renewal of band saws or for adjusting any of the mechanism used for adjusting band saw spacing. A laterally disposed shelf or platform 13 extends from one of the side walls 5 and a vertical wall 15 depends therefrom. An electric motor 17 is housed within these walls, and the motor may be mounted on a platform 19 in any suitable and conventional manner. The housing described above is open at one side providing an open throat as generally shown at 10, which, as will become apparent, provides the access means to the band saws for the initial cutting of a block of the rigid frozen, or the like, material. Extending forwardly from the closure member 9 is a platform 23 (see FIG. 6) and extending rearwardly therefrom is a further platform 25 (see FIG. 7 of the drawings), the purposes of these platforms will be explained hereinafter. The rear wall 1 of the housing is provided with an opening therein which is dimensionally the same as the opening 21 in the closure member 9, and is in alignment therewith, and the rear platform 25 while being of greater width than the opening 21 does extend across the bottom of such opening.

Operatively mounted within the housing are a plurality of spaced apart band saws 27, 29, 31, 33 and 35. While I disclose in this example one embodiment of my invention, from among many wherein 5 band saws are used, it must be understood that I may use a greater or lesser number of band saws depending upon the particular mode and type of sawing which is to be accomplished by the operation at station A. The band saws are operatively mounted within the housing 1 so that their path of travel brings each one of them into position at the sawing or access opening 21 in the closure for the housing and, of course, at the complementary opening in the rear wall 1 of the housing. The band saws 27–35 are of continuous construction and are provided on their operative edges with any suitable type of cutting teeth 35, and in the body 37 of each such band saw I provide two series of spaced apart band saw actuating apertures 39, in many installations of my invention, however, it may only be necessary to provide one such series of actuating apertures. Each band saw is operatively mounted within the housing in the general shape of an elongated loop and I provide a plurality of rollers 41 which are fixed to the rear wall of the casing adjacent to the top thereof and each band saw extends between and is guided by such rollers. The number of such rollers, in order to properly guide and cause each band saw to curve from the opening 21 upwardly and then downwardly towards the bottom of the housing, is a matter of operative design depending upon the particular installation, the size of the band saws being used and also upon the relative rigidity and size of the block being sawed.

Adjacent to the bottom of the casing and fixed to the rear wall thereof are a further series of rollers for the band saws which I have designated by the numeral 43. It will now be recognized that the band saws 27–35 operate in a continuous loop over and between the series of rollers 41 and the series of rollers 43, as is especially disclosed in FIGS. 1 and 2 of the drawings.

The electric motor 17 is employed to actuate each of the band saws in their travel over the rollers 41 and 43 and through the sawing area 21. The electric motor 17 is provided with a drive shaft 45 for driving the plurality of band saws and this shaft 45 operatively extends through the side wall 5 through any suitable type of journal bearing designated in its entirety by the numeral 47, and the shaft 45 extends into the casing and to the rear of the band saws and at the end thereof opposite to the motor is journaled in a journal bearing 49 which is fixed to and extends forwardly from the rear wall 1 of the casing. A drive portion of the shaft 45 where it extends rearwardly of the band saws is formed as a worm 51, which I shall term the drive worm of the drive shaft 45. I provide a plurality of drive pulleys or wheels 53, each of which is provided with a pair of spaced apart circumferentially disposed drive teeth 55 which extend into the actuating apertures 39 of its respective band saw for driving the same. Each pulley or wheel 53 at its rear end is provided with a pinion 57 which is in mesh with the worm 51 which is provided on the drive shaft 45 and each pulley or drive wheel 53 is rotatively mounted in any suitable manner on a bracket 59 which is fixed in any suitable manner, as at 61, to the rear wall 1 of the casing.

It will be appreciated that I provide one drive pulley or wheel 53 for each band saw which is used on the installation and it will be further appreciated that when the motor 17 is operated the shaft 45 and the worm 51 will also be rotated and since the worm is in mesh with each pinion 57, each pulley or wheel will be caused to rotate whereupon each band saw will travel in its operative course due to the fact that the actuating teeth 55 of each pulley will progressively project into each aperture 39 of each band saw to drive the band saw.

In many block cutting operations it is desirable to provide some means for adjusting the spacing between adjacent band saws in order to provide cutting slabs which may be either thicker or thinner. I have provided an arrangement whereby such adjustment of the spacing between adjacent band saws may be accomplished with facility. Such adjusting mechanism includes an upper arm 63 and a lower arm 65, the upper arm being pivotally mounted as at 67 to the rear wall 1 of the casing in position above the access opening 21, while the lower arm 65 is pivotally mounted as at 69 to the rear wall of the casing at a point below the access opening 21. Each arm extends from its point of pivotal mounting toward and beyond the series of band saws and to one side thereof, and each such arm has fixed thereto and forwardly projecting therefrom a series of spaced rollers 71. Each arm 63 and 65 adjacent to the end thereof which is opposite to the points of pivotal mounting is provided with a slot 73 therein, for a purpose which will be described. I provide an adjusting bar 75 which extends through and beyond a tubular housing 77 which is fixed in any suitable manner to the rear wall 1 of the housing. At those portions of the adjusting rod 75 which extend beyond the tubular housing 77 a forwardly projecting pin 79 is provided, and each of these pins extends into the slot 73 of its respective arm 63 or 65. Threadedly mounted in the forward wall of the tubular member 77 are a series of wing nuts 81.

In FIG. 1 of the drawings as illustrated, the band saw spacing mechanism is in position wherein the band saws are maintained as closely together as possible in this particular installation, while in FIG. 2 of the drawings I have illustrated the adjusting mechanism having been operated to increase the spacing between the adjacent band saws. Such spacing is accomplished by unscrewing the wing nuts 81, and moving the adjusting rod 75 upwardly so that each rod 63 and 65 will pivot on its respective pivot pins 67 and 69 so that the rollers 71 will urge and cause the bands saws to move to increase the spacing therebetween. It should be noted in this regard that the series of rollers 41a may be removed in the event that a wider adjustment of the spacing may be desired.

The means which I have disclosed for driving the plurality of band saws is one example from among many of band saw actuating means which may be used and still fall within the spirit and scope of this invention. Any suitable type of mechanism for altering the spacing between the band saws other than that disclosed herein as an example may, of course, be used, and I do not intend to be limited to the particular mechanism disclosed herein.

The platform 25 at the rear side of the sawing and cutting station A is adapted to receive thereon a block of rigid frozen, or the like, material which I have designated by the numeral 83, and as I have stated above these initially rigid frozen blocks are conventionally of elongated rectangular configuration. I provide on the platform 25 a lower block guiding means, which I have designated in its entirety by the numeral 84, comprising two transversely spaced upright guiding elements 85 and 87 into which the block 83 is positioned prior to being pushed through the band saws for the initial sawing operation to produce a plurality of cut slabs of the desired dimensions. If it is found that the width or thickness of the original rigid blocks may vary, I may so mount one of the guide elements 85 or 87 on the platform 25 so that it may be moved closer or further away from the opposing guide element. It will be recognized that this may be accomplished in any well known manner. I provide a further upper adjustable guide means designated generally by the numeral 89 which is coactive with the guide means 84. I make this guide means 89 adjustable so as to accommodate blocks 83 which may be of varying lengths or heights.

The adjustable guide means comprises a base plate 91 and a pair of depending flanges 93, which depend from the base 91 toward but spaced from the guide elements 85 and 87. The guide element 89 is positioned and maintained in any adjusted position in alignment with and above the lower guide means 84 by means of a rod 95 which projects from a tubular element 97 which is fixed in any suitable manner to the top 3 of the casing of the apparatus for Station A. Threadedly mounted within the tubular member 97 is a set screw or the like 99 which is adapted when tightened to bear against the rod 95 and to hold it in any adjusted position within the tubular element 97. Thus, it will be appreciated that by loosening the screw 99 the rod 95 may be adjusted within the tube 97 to thereby push the adjustable guide means 89 at any desired distance from the lower guide means 84 to thereby accommodate and guide rigid blocks 83 which may be of varying lengths.

Any number of rigid blocks 83, when the sawing apparatus of Station A is operating, may be disposed on the platform 25 and then, one at a time is positioned within and between the guide member 89 and the lower guide means 84, whereupon an original uncut block 83 is advanced to and through the band saw blades 27–35. Any suitable pusher means, which I have designated in its entirety by the numeral 101, may be employed for pushing the original block through the band saws. Such pusher element may comprise a pair of supporting and reinforcing bars 103 to the rear of the guide elements, to one of which is fixed a piston rod or the like 105 for projecting and retracting the entire pusher mechanism 101. In the example shown wherein I use five band saws, the pusher mechanism 101 will comprise pusher fingers 107, and in this example with the number of band saws used I provide four pusher fingers 107 each of which is of a width slightly less than the width of the spacing between each band saw so that when the pusher fingers are advanced or projected, each one may extend between a pair of adjacent band saws as the cutting operation is in progress to propel or advance the cut slabs 109 on to the platform or table 23. The pusher fingers 107 preferably, though not necessarily, extend between and are fixed to each reinforcing bar 103, and the piston 105 which is used to propel and retract the pusher mechanism 101 may be hydraulically, pneumatically or manually operated to push the original slabs through the sawing mechanism of Station A, and to retract the pusher for the next operation.

It is to be appreciated that any type of other pusher mechanism may be employed if desired.

The platform or table 23 which is provided at the outlet end of the sawing station A receives the cut slabs 109 on any suitable type of conveyor mechanism 111, and such cut slabs 109 are forwardly moved on the conveyor mechanism 111 into a guide and tumbling, or turning means 113 which causes such slabs 109 to fall or tumble into a pile such as 115 in which the slabs 109 are piled in a nonsymmetrical manner, but lying upon their flat surfaces as is particularly disclosed in FIG. 7 of the drawings.

The apparatus is provided with a further platform 117 which is on a level below the surface of the platform 23 so that the stack or pile of slabs 115 drops from the conveyor 111 on to a further conveyor 119 of any suitable type which is operatively mounted on the platform 117. The sawed slabs 109 which are stacked as shown at 115 are conveyed by the conveyor to a means which I have devised for reducing the number of slabs in a stack or pile to the desired number. Such means comprises a reducing arm 121 which is adjustably mounted, as at 123, on an upright slotted rod 125 which is fixed to the platform 117. The arm 121 extends over the conveyor 119, and is upwardly scooped, and in any vertically adjusted position on rod 125 it is in the path of the stack of slabs 115 so that as the stacks travel on the conveyor 118 a predetermined number are held back by the reducing arm 121.

The stacks of sawed slabs 109 travel on the conveyor 119 to the end thereof, whereupon they fall from the conveyor 119 on to a platform 127 which is at a level lower than the level of the conveyor 119.

The platform 127 forms a part of the station B, which is the second cutting station, and the slabs are advanced from the platform 127 into and through a plurality of rotary disc cutters which I have designated in their entirety by the numeral 129. In order to project or advance the stacks of slabs 109 into cutting relationship with the plurality of rotary disc cutters 129, I provide any suitable type of pusher mechanism which I have designed generally by the numeral 131 and this pusher mechanism is preferably of generally the same type as the pusher mechanism 101 which is used at the sawing and cutting station A. The pusher mechanism 131 preferably, though not necessarily, is composed of a pair of spaced apart reinforcing bars 135 to which are fixed a plurality of pusher fingers 137, and each pusher finger is of a width which is slightly less than the distance between the rotary disc blades 139 of the rotary disc cutter assembly 129. A piston rod 141 is fixed to the rear reinforcing bar 133 and when actuated pushes the pusher mechanism 131 with the fingers forwardly to advance a stack 119 of slabs into and through the rotary disc cutting assembly 139, and it will be apparent that the piston rod is operable to retract the pusher mechanism 131 and its pusher fingers 137 so that the next stack of slabs may be properly pushed and then advanced to and through the rotary disc cutter assembly. The pusher mechanism may be operated in any suitable manner as by hydraulic means, pneumatic means or manually.

I provide a pair of slab guide members 143 and 145 either one of which may be adjustably mounted in any suitable manner on the platform 127 in order to accommodate and guide slabs of different lengths.

It will now be evident from consideration of the drawings that the slabs 119 which have been sawed longitudinally at the station A are cut transversely by the assembly 129 into a plurality of sections 147.

The rotary disc cutter assembly 129 is operated in any suitable manner as by an electric motor 149 having a shaft 151 to which the plurality of disc cutter blades are fixed for rotation therewith. In many operations it is highly desirable to vary the thickness of the cut sections 147 and I have devised a simple arrangement whereby the variation of the spacing between the cutter discs 139 may be effected with facility. Referring particularly to FIGS. 9 and 10 of the drawings wherein I have disclosed removable spacer elements which I have designated generally by the numeral 153, such spacer elements 153 are of split ring construction comprising a pair of semicircular bodies 155 which are hinged together as at 157, and at the ends thereof opposite to the hinge 157 I provide on each semicircular element 155 a radially extending flange 157 providing a means for clamping the elements 155 about the shaft when the wing nut 161 is tightened. One of the spacers 153 is clamped around and to the shaft 151 between the cutting discs 139 and it will be apparent that by utilizing spacer elements 153 of different widths the spacing between the rotary cutter elements 139 may be varied.

I provide a storage housing 163 in which additional rotary cutter discs 139 may be stored.

The cut sections 147 which are pushed by the pusher mechanism through the rotary disc cutting assembly 139 are pushed through this assembly sufficiently so that they slide upon the side XY of a platform 165 of the final rotary disc cutting station C, and are pushed by the pusher mechanism onto the platform 165 in the direction of the arrow shown in FIG. 8 of the drawings. In FIG. 8 is illustrated a plurality of sections of frozen material 147 in readiness to be pushed through the rotary disc cutting mechanism which I have designated in its entirety by the numeral 167 of the final cutting station C. Now it will be apparent that the sections 147 are now cut by the mechanism 167 on lines transverse to the cuts 169 which were performed by the cutting mechanism at the station B so that in the entire system the blocks at station A are sawed longitudinally, at station B the slabs are cut on lines transverse to the saw lines performed at station A, and at station C the sections are cut transversely with respect to the cuts 169 which have been performed at the station B.

The rotary disc cutting mechanism 167 of station C comprises any suitable number of rotary disc cutting blades 169 fixedly mounted on a rotary shaft 171 which is driven by a motor 173. Spacer elements which are the same as those illustrated in FIGS. 9 and 10 are used with the rotary disc cutting mechanism 167 of station C so that the spacing between the rotary cutter blades 169 may be varied.

Guide members 175 and 177, for the cut sections, are fixed to the platform 165 to guide the sections 147 when they are pushed into and through the cutter mechanism 167, and either one of these guides is preferably adjustably mounted on the platform.

I provide a pusher mechanism at the station C for pushing the sections 147 into and through the cutter mechanism 167. Such pusher mechanism is preferably the same as those I use at stations A and B and comprise a pair of reinforcing and supporting bars 179 and 181 to which pusher fingers 183 are attached. A piston rod 185 is provided for advancing and retracting the pusher mechanism in the same manner as heretofore described.

The sections 147 are pushed into and through the cutter mechanism 167 to provide in the sections cuts 187 which are transverse to the cuts 169 which were made at the station B.

It will be apparent that the entire apparatus which consists of stations A, B and C may be completely automated by any well known timing system so that all of the pushers will operate in the proper timed relation relative to each other. It will also be appreciated that this entire system and apparatus substantially reduces the manpower which was heretofore necessary in cutting blocks of frozen edible material, or the like, into slabs or sections of the desired dimensions.

One example, from among many, of the uses to which my apparatus may be put is in the cutting of frozen blocks of edible products and may, for instance, be used in producing the proper size in the well known fish sticks of commerce, and similar edible frozen foods.

I claim:

1. Apparatus for reducing the size of blocks of rigid material by sawing and cutting, including in combination, a plurality of spaced apart band saws and individual drive means for each band saw for sawing a block along a plurality of substantially parallel lines into a plurality of slabs in a single sawing operation, transfer means for moving said slabs through a further cutting operation, said transfer means comprises a conveyor mechanism including means engaging said slabs as they travel on said conveyor mechanism and causing them to turn on their sides forming stacks of slabs, cutting means provided at said further cutting operation, and said slabs and said cutting means being relatively positioned for the cutting operation providing a plurality of substantially parallel cut lines forming a plurality of sections in a single cutting operation, said cut lines being transverse with respect to said saw lines, and further transfer means for moving said sections through a final cutting operation, further cutting means provided at said final cutting operation, and said sections and said further cutting means being relatively positioned providing a plurality of substantially parallel final cut lines forming a plurality of smaller sections in a single cutting operation, said final cut lines being transverse with respect to said cut lines.

2. Apparatus for reducing the size of blocks in accordance with claim 1, wherein said transfer means includes adjustable means engageable by said stacks and operable to reduce the number of slabs in a stack.

References Cited

UNITED STATES PATENTS

| | | | |
|---|---|---|---|
| 1,991,033 | 2/1935 | Steinward | 146—78 |
| 3,327,751 | 6/1967 | Lamb | 146—78 |
| 1,867,377 | 7/1932 | Rohwedder | 83—201.1 |
| 2,169,509 | 8/1939 | Wool | 146—78 |
| 2,392,486 | 1/1946 | Larsen. | |
| 2,941,560 | 6/1960 | McCaffery | 146—78 |
| 3,261,383 | 7/1966 | Coblentz. | |

W. GRAYDON ABERCROMBIE, Primary Examiner

U.S. Cl. X.R.

146—98